United States Patent [19]

Yoshihira

[11] Patent Number: 4,976,481
[45] Date of Patent: Dec. 11, 1990

[54] VEHICLE BODY FRONT OR REAR END STRUCTURE FOR MOUNTING SHOCK-ABSORBING TYPE BUMPER

[75] Inventor: Noboru Yoshihira, Ayase, Japan
[73] Assignee: Nissan Motor Company, Ltd., Japan
[21] Appl. No.: 312,873
[22] Filed: Feb. 21, 1989
[30] Foreign Application Priority Data

Feb. 22, 1988 [JP] Japan .............................. 63-22123[U]

[51] Int. Cl.$^5$ .............................................. B60R 19/34
[52] U.S. Cl. ..................................... 293/133; 293/155; 188/377
[58] Field of Search ............... 293/132, 133, 155, 134; 188/371, 376, 377

[56] References Cited

U.S. PATENT DOCUMENTS

| | | | |
|---|---|---|---|
| 3,880,455 | 4/1975 | Toemmeraas | 293/155 X |
| 3,915,486 | 10/1975 | Maeda et al. | 293/133 |
| 3,968,862 | 7/1976 | Gorges et al. | 293/133 X |
| 4,023,652 | 5/1977 | Torke | 293/133 X |
| 4,079,975 | 3/1978 | Matsuzaki et al. | 293/132 |
| 4,190,276 | 2/1980 | Hirano et al. | 293/133 |
| 4,272,114 | 6/1981 | Hirano et al. | 293/133 |
| 4,431,221 | 2/1984 | Jahnle | 188/377 X |
| 4,702,515 | 10/1987 | Kato et al. | 188/377 X |
| 4,823,923 | 4/1989 | Moyer | 293/133 X |
| 4,829,979 | 5/1989 | Moir | 293/133 X |

FOREIGN PATENT DOCUMENTS 904503  2/1954  Fed. Rep. of Germany ...... 293/132

Primary Examiner—Margaret A. Focarino
Assistant Examiner—Andrew C. Pike
Attorney, Agent, or Firm—Lowe, Price, LeBlanc, Becker & Shur

[57] ABSTRACT

A front end structure of a vehicle body includes a pair of front side members and a pair of bumper mounting brackets secured to front ends of the side members. A pair of shock absorbers are interposed between a bumper and the respective bumper mounting brackets to interconnect the same. The bumper mounting brackets are constructed so that a maximum compressive load thereof is smaller than that of the side members and larger than a maximum opposing force of the shock absorbers.

7 Claims, 1 Drawing Sheet

VEHICLE BODY FRONT OR REAR END STRUCTURE FOR MOUNTING SHOCK-ABSORBING TYPE BUMPER

BACKGROUND OF THE INVENTION

I. Field of the Invention

The present invention relates in general to a vehicle body construction and more particularly to a vehicle body front or rear end structure for mounting a shock-absorbing type bumper, i.e., a bumper of the type attached to the ends of side members by way of shock absorbers.

II. Description of the Prior Art

In order to mount a bumper on the ends of side members, it has been practiced to simply provide to the ends of the side members flanges extending crosswise of the vehicle body, i.e., extending so as to intersect the longitudinal direction of the vehicle body at right angles and attach to the flanges in a butt joint manner shock absorbers on which the bumper is mounted.

However, when the side members are simply provided with the flanges on which the shock absorbers are mounted, an impact load upon a collision is transferred to the side members by way of the shock absorbers to act thereon, resulting in the side members being damaged and a large repair cast being incurred.

SUMMARY OF THE INVENTION

It is accordingly an object of the present invention to provide an improved vehicle body construction which can effectively prevent side members from being damaged upon a collision of a vehicle.

It is another object of the present invention to provide an improved vehicle body front or rear end structure for mounting a shock absorbing type bumper, which is effective for preventing side members from being damaged when the bumper is subjected to an impact load larger than an opposing force of the shock absorber.

It is a further object of the present invention to provide an improved vehicle body front or rear end structure of the above described character which can be repaired with ease and therefore reduce the expense of any repair thereof.

In accordance with the present invention, there is provided an improved vehicle body construction which comprises a side member having a longitudinal end, a bracket provided to the longitudinal end of the side member, a bumper and a shock absorber interposed between the bumper and the bracket to interconnect same. The bumper mounting bracket is constructed so that its maximum compressive load is smaller than that of the side member and larger than a maximum opposing force of the shock absorber. The side member has a lower wall formed with an opening of predetermined shape and size and the shock absorber has an inner end portion received within the side member. The bracket is tubular in shape and is formed with a bead to cause the shock absorber to turn in a predetermined direction to enable the end portion thereof to go into said opening in the event the bracket is collapsed.

The above structure is effective for solving the above-noted problem inherent in the prior art vehicle body.

DESCRIPTION OF THE PREFERRED EMBODIMENT

Figure 1:
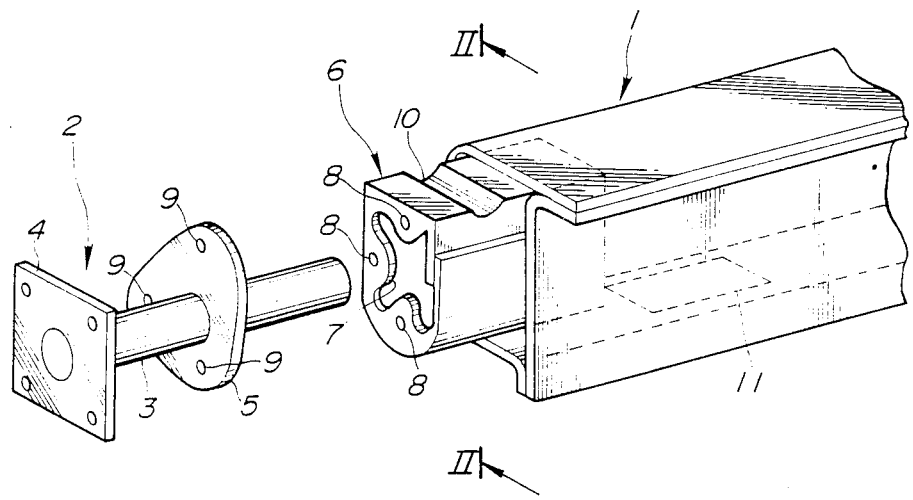
FIG. 1 is a perspective, partly exploded view of a vehicle body longitudinal end structure for mounting a shock absorbing type bumper according to a preferred embodiment of the present invention.
Figure 2:
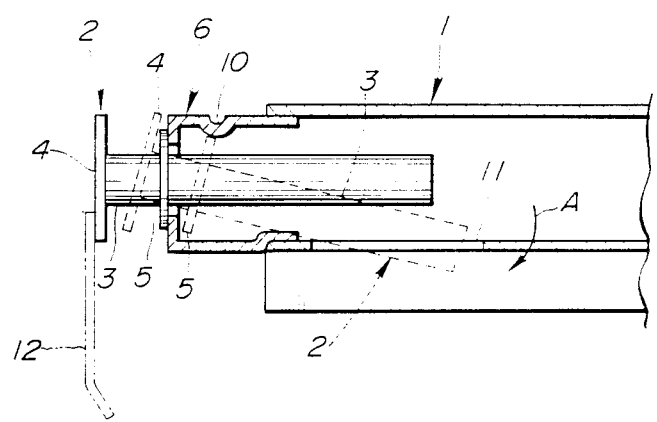
FIG. 2 is a sectional view taken along the line II—II of FIG. 1.

Referring to FIGS. 1 and 2, indicated by the reference numeral 1 is a front side member which installs at a front end thereof a shock absorber 2. The shock absorber 2 has a rod-like section 3 and a first flange 4 in the form of a rectangular plate secured to a front end of the rod-like section 3. The flange 4 is adapted for installation of a bumper 12. The shock absorber 2 further has a second flange 5 secured to a longitudinally intermediate portion of the rod-like section 3. The second flange 5 is used for installing the shock absorber 2 on the front side member 1.

A bumper mounting bracket 6 is welded or otherwise secured to the front end of the front side member 1 for installation of the shock absorber 2. The bumper mounting bracket 6 is formed from a sheet of steel and tubular in shape, i.e., rolled to have a rectangular cross section. A rear end portion of the bumper mounting bracket 6 is inserted into a front end portion of the front side member 1 and welded or otherwise secured to same. The bumper mounting bracket 6 has at a front end thereof an inward flange 7 for installation of the shock absorber 2. The inward flange 7 of the bumper mounting bracket 6 and the above described second flange 5 of the shock absorber 2 are respectively formed with a plurality of bolt holes 8 and 9 corresponding in position relative to each other. Bolts (not shown) are inserted into the bolt holes 8 and 9 for securing the shock absorber 2 to the bumper mounting bracket 6. That is, upon installation of the bumper 12, the rod-like section 3 of the shock absorber 2 is partly inserted into the bumper mounting bracket 6 and the front side member 1 through the flange 7 until the second flange 5 abuts upon the flange 7. The bolts are inserted into the bolt holes 8 and 9 for connecting the flanges 5 and 7 together. The bumper 12 is then installed on the first bracket 4 of the shock absorber 2.

The material and shape of the above described bumper mounting bracket 6 is determined so that its maximum compressive load is larger than a maximum opposing force of the shock absorber 2 (i.e., a maximum force or load which the shock absorber 2 can bear or withstand) and smaller than a maximum compressive load of the front side member 1. That is, the bumper mounting bracket 6 is constructed so as to be more fragile or collapsible with respect to a compressive load than the front side member 1 but can withstand the load larger than the maximum opposing force of the shock absorber 2.

When the bumper mounting bracket 6 and the front side member 1 are subjected to a compressive force or load larger than their maximum compressive loads, they are crushed or deformed. Accordingly, upon a collision of a vehicle, i.e., when the bumper 12 is subjected to a shock or an impact load larger than a predetermined value, only the bumper mounting bracket 6 is crushed while absorbing the impact load, whereby to make it possible to protect the front side member 1 from being damaged without obstructing the operation of the shock absorber 2, i.e., without lowering the effect of the shock absorber 2.

The bumper mounting bracket 6 is formed with a bead 10 extending crosswise of the vehicle body, i.e., extending so as to intersect the longitudinal direction of the vehicle body at right angles. The bead 10 provides the bumper mounting bracket 6 with a collapsible portion for encouraging collapse of the bumper mounting bracket 6. Upon a collision of a vehicle, the collapsible portion or bead 10 encourages the bumper mounting bracket 6 to crush in such a way as to cause the rod-like section 3 of the shock absorber 2 to rotate in the direction of the arrow "A" in FIG. 2. The shock absorber 2 in a rotated state is shown by the dotted lines in FIG. 2.

In this connection, a lower wall of the front side member 1 is formed with an opening 11 for allowing the rear end of the shock absorber 2 to pass therethrough. By the provision of the opening 11, the shock absorber 2 rotates without interfering with the lower wall of the side member 1, whereby to make it possible to protect the side member 1 from being damaged by the shock absorber 2. Accordingly, in case of many front end collisions, the damaged front end structure of the vehicle body can be repaired by replacing the bumper mounting bracket 6 only.

In the meantime, the pair of the collapsible bead 10 and the opening 11 can be provided at a different location or more than are such pair or can be provided in a plurality of places.

From the foregoing, it will be understood that upon a head-on collision of a vehicle, only a bumper mounting bracket or brackets are crushed or collapsed while absorbing the shock without obstructing the operation of shock absorbers, thus making it possible to prevent a side member or members from being damaged.

It will be further understood that the front end structure of the vehicle body having bee described and shown as above is symmetrical about a longitudinal center axis of the vehicle body and description thereof has been made with details pertaining to only to one of the two symmetrical halves of the vehicle body for brevity.

It will be further understood while the present invention has being described and shown as being applied to the front end structure of the vehicle body, this is not limitative but it can be similarly applied to the rear end structure of the vehicle body.

What is claimed is:

1. A vehicle body construction, comprising:
   a side member, having a first end;
   a bracket, provided at said first end of said side member;
   a bumper; and
   a shock absorber, interposed between said bumper and said bracket to interconnect the same;
   said bracket being constructed so that a maximum compressive load thereof is smaller than that of said side member and larger than a maximum reaction force of said shock absorber, wherein
   said shock absorber has an inner end portion received within said side member,
   said side member has a lower wall formed with an opening of a shape and size suitable for receiving said inner end portion of the shock absorber therethrough when the shock absorber is forcibly turned in a predetermined direction, and
   said bracket is tubular in shape and is formed with a bead for causing said shock absorber to turn in said predetermined direction that enables said inner end portion of said shock absorber to go into said opening in response to a forcible collapsing of said bracket.

2. The vehicle body construction according to claim 1, wherein:
   said bracket is formed from a sheet of steel and rolled to have a rectangular cross section, said bracket being secured at a fixing end to said first end of said side member.

3. The vehicle body construction according to claim 2, wherein:
   said shock absorber has a rod-like section partly received in said bracket and said side member.

4. The vehicle body construction according to claim 3, wherein:
   said shock absorber has at an intermediate portion of said rod-like section a first flange extending transversely thereof, said bracket having at a distal end thereof a flange to which said flange of said shock absorber is secured.

5. The vehicle body construction according to claim 4, wherein:
   said rod-like section of said shock absorber has a second flange at an outer end, the outer end projecting outwards from said bracket, said bumper being attached to said second flange.

6. The vehicle body construction according to claim 5, wherein:
   said bead is formed at one side of said bracket so that collapse of said bracket causes said rod-like section of said shock absorber to rotate about said first flange thereof.

7. A vehicle body construction, comprising:
   a pair of side members;
   a pair of brackets, provided at respective first ends of said side members;
   a bumper; and
   a pair of shock absorbers interposed between said bumper and said brackets, respectively, to interconnect the same;
   said brackets being constructed so that a maximum compressive load thereof is smaller than that of said side members and larger than a maximum reaction force of said shock absorbers, wherein
   said shock absorbers have inner end members respectively received in said side members,
   said side members each have a wall formed with an opening, and
   said brackets are tubular in shape and are each formed with a bead for causing the corresponding shock absorber to turn in a predetermined direction to allow said end portion of said corresponding shock absorber to go into the opening of the corresponding side member if said bracket collapses.

* * * * *